United States Patent [19]

Lazarz et al.

[11] 4,252,878
[45] Feb. 24, 1981

[54] PROCESSES OF WETTING HYDROPHOBIC FLUOROPOLYMER SEPARATORS

[75] Inventors: Christine A. Lazarz, Niagara Falls, N.Y.; Ursula I. Keller, Queenston, Canada; Edward H. Cook, Jr., Niagara Falls, N.Y.

[73] Assignee: Hooker Chemicals & Plastics Corp., Niagara Falls, N.Y.

[21] Appl. No.: 126,598

[22] Filed: Mar. 3, 1980

[51] Int. Cl.$^3$ .............................................. H01M 2/16
[52] U.S. Cl. .................. 429/250; 29/623.5; 427/58
[58] Field of Search .............. 429/250, 249, 248, 251, 429/252; 29/623.5; 427/58, 121, 430 A, 439

[56] References Cited

U.S. PATENT DOCUMENTS

| | | | |
|---|---|---|---|
| 3,472,700 | 10/1969 | Kollman et al. | 429/250 |
| 3,918,995 | 11/1975 | Palmer et al. | 429/250 X |
| 3,930,886 | 1/1976 | Mesiti et al. | 136/146 |
| 4,012,541 | 3/1977 | Hirozawa | 427/243 |
| 4,089,758 | 5/1978 | McAloon | 204/98 |
| 4,125,451 | 11/1978 | Patil et al. | 204/296 |
| 4,126,535 | 11/1978 | Balko et al. | 204/296 |
| 4,126,536 | 11/1978 | Balko et al. | 204/296 |
| 4,153,530 | 5/1979 | Vallance et al. | 204/252 |

OTHER PUBLICATIONS

Zonyl ® Fluorosurfactants, E. I. DuPont Product Bulletin, Mar. 1977.

Primary Examiner—Charles F. LeFevour
Attorney, Agent, or Firm—Peter F. Casella; Howard M. Ellis

[57] ABSTRACT

Hydrophobic polymeric separators are made wettable to electrolytic cell fluids by a post-manufacturing process of treating with fluorinated surface-active agents. The application of a hydrophilic film of fluorosurfactant onto separator surfaces followed by drying renders the separator permanently wettable. The hydrophilic surfaces rendered inert by drying are reactivated in-situ after installation of the separator by contacting the separator surfaces with heated aqueous solution. The pre-installation process provides a convenient means for shipping fully manufactured separators and for their storage by users until actually needed. From an operational standpoint, the pre-installation process eliminates fouling of the cell with foam occurring with conventional in-situ wetting procedures.

25 Claims, No Drawings

PROCESSES OF WETTING HYDROPHOBIC FLUOROPOLYMER SEPARATORS

BACKGROUND OF THE INVENTION

This invention relates to electrolytic cell separators and more particularly, to methods of making separators which will serve as substitutes for asbestos diaphragms especially in cells used for the electrolysis of alkali-metal halide brines. Still more particularly, it relates to a post-manufacturing process for treating polymeric electrolytic cell separators, usually fluoropolymer-containing, which are inherently hydrophobic, and not wettable by the cell fluids.

Chlorine is produced almost entirely by electrolytic methods, primarily from aqueous solutions of alkali metal chloride. In the electrolysis of such solutions or brines chlorine is generated at the anode and alkali metal hydroxide, such as sodium or potassium hydroxide is produced at the cathode, together with hydrogen. Because the anode and cathode products should be kept apart to prevent reactions between them many cell designs have been developed to accomplish such separation. The designs have generally utilized either a diaphragm or a mercury intermediate electrode to separate the anolyte and catholyte.

In diaphragm cells brine is fed continuously into the cell and flows from the anode compartment through an asbestos diaphragm to the cathode compartment, which contains, for example, an iron cathode. To minimize back-diffusion and migration, the flow rate is maintained so that only a part of the salt present is electrolyzed. The hydrogen ions form hydrogen gas at the cathode, leaving hydroxyl ions in the cathode compartment. The catholyte solution, which contains sodium hydroxide and unchanged sodium chloride, is subsequently evaporated to obtain the hydroxide. In the course of such evaporation much of the sodium chloride precipitates and is separated, dissolved and sent back to the electrolytic cell, often as an aqueous solution or brine feed to the anolyte compartment. Thus, the function of the diaphragm is to maintain a desirably high concentration of alkali in the catholyte, to minimize the diffusional migration of hydroxyl ions into the anolyte and to maintain separation of chlorine from hydrogen and alkali metal hydroxide. The diaphragm should also have minimal electrical resistance to lower power consumption during electrolysis.

It has been customary to use asbestos deposited material as the diaphragm of choice, however, asbestos has not been entirely satisfactory. Asbestos diaphragms have a relatively short service life and asbestos has become a suspect health hazard. Consequently, synthetic substitutes for asbestos have been developed from fluoropolymers, such as polytetrafluoroethylene. A few of such fluoropolymer-based diaphragms are described in U.S. Pat. No. 3,890,417, U.S. Pat. No. 3,281,511 and U.S. Pat. No. 3,556,161.

Although fluoropolymer diaphragms have better service life expectancy and do not present the same potential health hazards as asbestos they nevertheless have the drawback of being hydrophobic and are not wettable by cell liquor. Wettability is troublesome in that it is difficult to achieve the desired flow characteristics of the electrolyte through the diaphragm if it is hydrophobic. Furthermore, if the diaphragm dewets while operating the cell will become inoperative for all practical purposes.

Heretofore, others have employed surface active agents and numerous other additives to polymeric diaphragms in an effort to solve the wettability problem. However, the results in many instances were less than satisfactory. For example U.S. Pat. No. 4,126,535 suggests the addition of fluorinated surfactants to the anolyte liquor of the cell in order to initiate flow through the diaphragm. This in-situ method of wetting polymeric diaphragams in the cell with surface active agents causes operational difficulties because internal cell components e.g. electrodes become coated with the surfactant. Furthermore, surfactants in many instances are foaming agents and their accumulation in the cell causes foam to collect in the gas headers and caustic collectors which become clogged. As a result, before start-up the cell must be drained and flushed with large volumes of water.

In U.S. Pat. No. 4,170,540 and continuation-in-part Ser. No. 064,616, filed Aug. 7, 1979 two of the three inventors are also co-inventors of this application. Such disclosures are not admitted to be prior art against the present application, but are referred to herein as being of interest. Both disclosures teach fluorosurfactants as lubricants used as additives during the process of making microporous PTFE diaphragms. After milling, the diaphragm sheets are dried to remove the volatile components of the lubricant additives, followed by high temperature sintering usually above the crystalline melting point of the polymer. Elevated temperatures for drying and sintering in combination with the use of acid to leach the pore former from the diaphragm eliminates most of the desired wetting properties which may have resulted from the use of surfactants during the manufacturing phase.

U.S. Pat. Nos. 3,930,886; 4,089,758; 4,126,536 and 4,153,530 disclose the addition of hydrophilic filler materials to the separator, including titanium dioxide, silicon dioxide, barium sulfate, potassium titanate and zirconium oxide. The addition of special fillers to the separator as wetting agents during the manufacturing phase has not given consistent, uniform results.

U.S. Pat. No. 4,012,541 discloses the use of an acetal-type non-ionic surfactant for wetting hydrophobic polymer diaphragms. Although the final results appear satisfactory the diaphragm is stored indefinitely in the surfactant to avoid drying out and is removed from the solution just prior to installation.

U.S. Pat. No. 4,125,451 discloses chlor-alkali cell diaphragms made from fluorinated hydrocarbon polymeric fibers which are first dispersed in an aqueous-acetone medium with surface active agents to form a slurry. The suspended fibers are deposited directly onto a cathode screen in the form of a porous network of fibers without the need for special bonding. The surfactants used to suspend the fluoropolymer fibers are either anionic or nonionic types which may be either non-fluorinated or fluorinated, including those available under such trademarks as FLUORAD FC-126 or FC-170 and ZONYL FSN, FSA or FSP fluorosurfactant. Apparently because of the diaphragm's high porosity the caustic produced was only 98 gpl at 81% current efficiency. Under such circumstances with such a highly porous diaphragm where the caustic concentration cannot build-up to commercially acceptable levels wettability is not viewed as a significant factor influencing diaphragm performance.

Accordingly, it has been discovered that polymeric based diaphragms can now be made to provide commercially acceptable performance characteristics which are at least equivalent in performance to asbestos-type diaphragms. Fluoropolymer diaphragms may be further treated after manufacturing to achieve high current efficiency, e.g. current efficiencies of at least 85% when measured in a chloralkali cell at a sodium hydroxide concentration of 150 gpl. The improved process imparts "permanent wettability" properties to a substantially hydrophobic material having hollow micropores particularly in diaphragms subjected to elevated temperatures for prolonged time periods during manufacturing. The application of a film of fluorinated surface active agent on the internal and external surfaces of the diaphragm imparts permanent wettability properties which only needs exposure to heated water or other aqueous solutions for activation prior to cell assembly or cell start-up. For purposes of the present invention "permanent wettability" is intended to mean a separator after being fitted into a chlor-alkali cell will remain stable and not lose its tendency to be wetted by the contents of the cell after being activated such that the surfaces do not become completely dry. It has been discovered that as long as pore wall surfaces remain moist either by direct contact with cell fluids or internal cell humidity wettability properties will not be lost. Unlike other processes, treated diaphragms according to the present invention may be dried for storage and shipping without losing wettability properties, and further treatment with chemical agents or additives can be eliminated.

Therefore, it is a principal object of the present invention to provide an improved method for imparting wettability properties to inherently hydrophobic microporous electrolytic cell separators.

It is further object of the present invention to provide a means for imparting wettability properties to fluoropolymer based microporous separators without requiring concomitant use in electrolytic cells.

A still further object of the present invention is to prepare fluoropolymer microporous diaphgrams which will provide performance characteristics at least equivalent to asbestos diaphragms which will not dewet while in serivce.

These and other objects, features and advantages will become apparent to those skilled in the art after a reading of the following more detailed description.

PREFERRED EMBODIMENTS OF THE INVENTION

Broadly, the invention relates to a method of making a hydrophobic polymeric electrolytic cell separator wettable to the contents of the cell, which comprises (a) before installing into the cell contacting the surfaces of the separator with a fluorinated surface active agent imparting a hydrophilic film thereto, and (b) inactivating the hydrophilic surfaces of the separator rendering them inert by drying which surfaces may be subsequently reactivated by contacting with aqueous solutions above ambient temperature.

Reactivation of the hydrophilic surfaces may be effectuated before or after final cell assembly, but in each case prior to cell start-up. For example, after the separator has been fitted onto the cathode can of a chlor-alkali cell the fited cathode may be immersed in a bath containing aqueous solutions, such as alkali metal halide brine, dilute cell liquor (caustic) or water. Because of the hydrophilic properties of the fluorosurfactant film the separator surfaces remain moist for more than one hour, and in many instances several hours after removal of the fitted cathode from the bath even when exposed to ambient atmospheric conditions. Because the surfaces of the separator remain wet and/or moist after removal from the bath in most instances there is sufficient time for fitting the cathode over the anode, sealing the cell and installing in the cell circuit without the loss of wettability properties. At this point the cell can be immediately filled with saturated brine as the first stage of the cell start-up.

As an alternative method for reactivating the hydrophilic surfaces of a porous PTFE cell separator, the fitted cathode may be installed over the anode assembly and the cell sealed prior to reactivation of the separator's hydrophilic surfaces. The wettability properties of the separator may then be reactivated in-situ by circulating heated brine or water through the sealed cell. This in-situ method of reactivating the wettability properties of a porous polymeric cell separator is utilized before applying a decomposition voltage to the cell, or in other words, prior to actual cell start-up.

In discussing the separators herein reference is made principally to polytetrafluoroethylene (PTFE). However, this is for convenience purposes only, and should not be construed as restrictive to the scope of polymers which may be employed. Suitable polymers for electrolytic cells which for purposes of this invention include cells and chlor-alkali cells used for the electrolysis of alkali metal halide brines are wide ranging. Virtually all such polymers exhibit varying resistances to wetting by the contents of electrolytic cells and include both homopolymers and copolymers with the only actual restriction being that they be capable of withstanding the internal corrosive environment of an electrolytic cell. Although a wide range of thermoplastic polymers have suitable properties for use as cell diaphragms, fluorine-containing homo and co-polymers appear best suited. In addition to polytetrafluoroethylene, other satisfactory fluoropolymers include polyvinylfluoride, polyvinylidenefluoride, polychlorotrifluoroethylene, polyfluoroethylenepropylene, polyfluoroalkoxyethylene, and copolymers like chlorotrifluoroethylene plus ethylene. Non-fluorine containing polymers include PVC, postchlorinated PVC, polyethylene, polypropylene, and the like. It is to be understood however, that the latter group of polymers although they may be used as cell separators their life expectancy is usually shorter than fluoropolymers, and therefore, are less preferred.

The disclosed process is not restricted for use in connection with polymeric separators made by any special methods, but applies to all such separators regardless of whether they are made by additive leach, biaxial stretching, track etch, dispersion casting, phase inversion cast or skiving, and the like. Separators which have a relatively high level of tortuous micropores are especially adaptable, sicne the process assures complete wetting of both exterior surfaces of the separator, as well as the interior pore walls.

The method of wetting polymeric, e.g. PTFE separators according to the present invention provides permanent and stable wettability properties to a group of relatively hydrophobic materials which comprise after manufacturing the separator, but before installing into an electrolytic cell contacting the surfaces of the separator with a fluorinated surface active agent whereby a film of the agent deposits and adheres to the exterior surfaces and intrior pore walls of the separator. The separator is subsequently dried to evaporate any excess surfactant and surfactant vehicle adhering to the surfaces. By drying the separator the hydrophilic film is rendered inactive thereby permitting easy tailoring, sealing, fitting or retrofitting of the separator into an electrolytic cell. Likewise, because of the inert condition of the separator when in a dried state further advantages are realized which permit greater flexibility in terms of storage, inventoring or as a convenient form for shipping without concern over possible loss of wettability properties. Before or after final cell assembly, but prior to cell start-up the surfaces of the fitted and installed separator are contacted with heated aqueous solutions, usually sodium chloride brine solutions or water or dilute caustic to activate the wettability properties of the hydrophilic film.

The surface active agent is applied to the separator most preferably under negative pressure and at ambient temperatures. A vacuum typically of 25 mm of mercury is most desirable to assure impregnation and distribution of the surface active agent into the separator pores and deposition of a film onto the pore wall surface. Application should be complete in as little as thirty minutes, but generally one and up to two hours is allowed. According to the present invention, the quantity of fluorosurfactant used in making porous polymeric separators wettable is mainly dependent on such factors as economy and time under vacuum. Generally appropriate concentrations of fluorosurfactant solution are wide ranging and may, for example, be as low as 0.1 percent and as high as 100 percent by weight active ingredient. Assuming the fluorosurfactant is inexpensive, concentrations up to 100 percent by weight may be employed provided the viscosity of the solution is low enough to permit impregnation of the separator's internal micropores, and the surfactant film will dry without excessively long drying cycles. One must also avoid a waxy-like appearance on separator surfaces which can occur with some highly concentrated surfactant solutions. Instead of the desired translucent appearing surface, a waxy surface can cause separator handling and shipping difficulties, as well as providing inferior wettability properties.

Concentrations of fluorosurfactant solution may be lowered to 3 percent by weight while maintaining the vacuum at 29 inches of Hg (psi) for 3 hours. Complete wetting will still take place, when lowering the concentration of fluorosurfactant to as little as 0.1 percent, however, the time under vacuum should be increased upwards to 48 hours to insure complete wetting. Thus, the concentration of fluorosurfactant used is determined by economics, balanced off by the time required to apply the surfactant. Exceeding the times indicated for vacuum deposition will not damage the separator, but will insure complete wetting of the separator surfaces.

The surface active agents employed are preferably fluorinated compounds capable of imparting substantially permanent wettability properties to the porous PTFE separators. Although non-fluorinated surface active agents may be used in the post-manufacturing process described herein, their use is less preferred because of the lower degree of permanence in terms of wettability properties. It was discovered that separators treated with such agents have a tendency to dewet after periods of operation in a chlor-alkali cell environment which in-turn results in higher cell voltages and electrolyte head heights.

The fluorinated surface active agents according to the present invention may include anionic, cationic, nonionic and amphoteric types either alone or in mixture. Typical useful fluorosurfactants include those available under the 3M trademark Fluorad. This group of commercially available proprietary fluorosurfactants include such members as "FC-134" cationic type; "FC-128" anionic fluorosurfactant and nonionic types identified by the trademarks "FC-430" and "FC-170". Fluorad FC-170 is especially desirable because of its misibility in either water, isopropanol or in alcohol-water mixtures. FC-170 is a proprietary mixture of fluorinated alkyl based polyoxyethylene alcohols containing 38.3% carbon, 31.3% fluorine and 5.3% hydrogen by weight.

Other commercially available useful fluorinated surface active agents are those available from DuPont under the Zonyl trademark. Exemplary of such materials is Zonyl FSB (amphoteric fluorosurfactant which is a fluoroalkyl substituted betaine) Zonyl FSC (cationic tertiary amine which is a fluoroalkyl substituted quaternary ammonium based dimethyl based sulfate) and Zonyl FSP (anionic fluorosurfactant which is an ammonium fluoroalkyl phosphate).

The most preferred fluorinated surface active materials for use in achieving permanent wettability of fluoropolymer separators according to the present invention are nonionic and haver perfluorinated hydrocarbon chains in their structure. Such materials may be considered as having the formula $F_3C(CF_2)_mCH_2CH_2O(CH_2CH_2O)_nH$, wherein m is from 5 to 9 and n is about 11. The foregoing fluorosurfactant is available under DuPont's trademark Zonyl FSN. Desirably, in such formula m is 7 or about 7. However, other perfluorinated poly-lower alkylene oxides glycol base ethers of the type illustrated can also be employed, including those wherein m is from 3 to 19 and wherein n is from 6 to 19, preferably 7 to 13. The various compounds within said formula will have the perfluoroalkyl and polyethylene oxide portions thereof so chosen to provide a satisfactory film of the surfactant on the exterior and interior pore walls of the separator, said surfactant being either in the form of a liquid or one which will be sufficiently soluble, emulsifiable or dispersable in a liquid medium, such as water or lower alcohol, e.g. isopropanol.

Instead of using the perfluoroalkyl moiety of the formula compound or of the broader generic description given above one may employ a partially fluorinated hydrocarbon moiety or a fluorochloro or fluorobromo moiety. Generally, however, it is preferred that the hydrocarbyl or other aliphatic lipophilic portion of the surface active agent should have at least half the hydrogen which could be present on the carbon atoms thereof replaced by fluorine atoms. Such surface active agents can be made by ethoxylation of the corresponding fluorinated alkanol, e.g. perfluoroalkylethanol. In some cases the surface active agent may be almost or completely fluorinated. For example, it is contemplated that there be utilized perfluoroalkanols of carbon chains of similar length to those mentioned above.

Instead of the ether-type compounds of the above-given formula there may be substituted other nonionic analogues, such as esters, which can be made by polyethoxylation of a corresponding perfluoroalkylated lower carboxylic acid.

The Zonyl FSN type of fluorosurfactant lubricants for the present application are usually supplied in liquid form at a concentration of about 20 to 50% solids in isopropanol or isopropanol-water solution. The solvent system may be replaced by other compatible solvents and solvent mixtures but isopropanol is preferred. When water is present, the weight ratio of isopropanol to water will usually be in the range of 1:1 to 1:50 e.g. 1:5 to 1:20, which ranges apply to water-ethanol systems, too.

After the surfaces of the separator have been thoroughly treated with the surface active agent the separator is dried to evaporate any excess solution. This step may be carried out at ambient temperature, or drying can be accelerated by placing in a circulating hot air oven at a temperature ranging from about 30° to about 80° C. Drying does not adversely affect wettability properties, but instead inactivates the hydrophilic surfaces of the separator rendering them inert, thus eliminating further need for chemical treatment by the ultimate user. Separators can be packaged for shipment and/or storage until needed for future cell installations. There are no special storage requirements other than to maintain them in a dry state. Plant operators can easily inventory the treated separators until replacement becomes necessary thereby minimizing costly down-time. However, as an alternative, after wettability properties have been inactivated by drying, separators can also be easily cut and sealed to the desired pattern for fitting a given cell design. This may be accomplished, for example, by any number of methods including that disclosed in co-pending application Ser. No. 075,489, filed Sept. 14, 1979.

Prior to cell start-up solutions heated to temperatures of at least 50° C. are used to reactivate the wettability properties of the separator. This may be achieved, for example, by immersing the cathode of an electrolytic cell having fitted, installed separators into a bath containing heated, aqueous solution, or prior to cell start-up using an in-situ method of reactivation by feeding aqueous solution into a fully assembled and sealed cell. Reactivation is usually complete within a period of one to two hours, however, the actual exposure or contact time needed to fully activate the wettability properties of the separator will be inversely proportional to the temperature of the reactivation solution. The solutions used are preferably aqueous, and include for example brines containing up to about 300 gpl alkali metal halide or dilute caustic containing cell liquor. The more concentrated brines, such as those customarily used in manufacturing sodium and potassium hydroxide containing up to 320 gpl sodium or potassium chloride even at high alkalinity (pH ~ 12) are also satisfactory. It has been noted on occasion that aqueous brines having salt concentrations in excess of 300 gpl do produce a brief period of elevated height in electrolyte head on the anolyte side of the cell which may be due to a "plugging"-like effect of the pores which restricts for a short period the free flow of electrolyte after cell start-up.

The following specific examples demonstrate the process of the instant invention, however, it is to be understood that these examples are for illustrative purposes only, and do not purport to be wholly difinitive as to conditions and scope.

EXAMPLE I

A microporous separator sheet is prepared by a process disclosed in U.S. Pat. No. 4,170,540 comprising the steps of (a) forming a sheet containing DuPont's Teflon® grade 6A PTFE powder, calcium carbonate as the pore former and Zonyl® FSN fluorosurfactant, (b) sintering the sheet, (c) leaching the pore former in hydrochloric acid and (d) rinsing in water and air drying the separator. The microporous PTFE sheet is placed in a cylindrical tank containing a 3 percent w/w concentration of Zonyl FSN nonionic fluorosurfactant in water. The tank is approximately two-thirds full of liquid. Some residual alcohol remains, as the surfactant is sold as an alcoholic solution (50% w/w FSN). The porous PTFE sheets is held by a fixture so that it is completely immersed in the solution. The tank is sealed and a vacuum of 26 inches of mercury (gauge) is applied to the vapor phase above the liquid. The liquid temperature is ambient. The vacuum is continued until most of the air is evacuated from the microporous structure taking about one hour. During the initial application of vacuum, significant foaming is observed caused by the rapid evolution of air at the surface of the tank. Once most of the air has been evacuated from the pores all surfaces, both external and internal, are coated by the surfactant. The vacuum is discontinued and the liquid drained from the tank. The wet microporous separator is dried by passing air over the surface at 30° C. After about 20 hours the microporous separator appears to be dry. The dried sample may be stored until needed for use as a diaphragm material in an electrolytic cell.

The dried separator after being installed as a diaphragm in a chlor-alkali cell is activated in-situ after cell assembly is completed by feeding hot water into the cell at 70° C. for approximately 90 minutes. The microporous separator is now activated and made wettable. The hot water is drained from the cell and the separator will remain wettable as long as the relative humidity inside the cell remains above 90%.

EXAMPLE II

A microporous separator is fabricated following steps (a)–(d) of Example I. However, instead of air drying the separator in the final step after rinsing, the PTFE sheet is placed in a tank containing 3M company "FLUORAD" FC-134 cationic fluorosurfactant. The surfactant is used as a 2.5% solution diluted with equal parts water and isopropyl alcohol. A film of the surfactant is applied to the separator while pulling 29 inches Hg holding constant for 3 hours. The separator has a translucent appearance with an orange-rust color which air dries in about one hour. The separator is tailored, heat sealed and retrofitted onto the steel cathode of a Hooker H4 type chlor-alkali cell and activated by lowering into a water bath for 90 minutes maintained at a constant 70° C. The cathode is removed and lowered onto an anode base assembly of dimensionally stable anodes, sealed and installed in a cell circuit without the loss of wettability properties.

EXAMPLE III

Approximately 700 sq. ft. of microporous separator prepared by the process of Example I is submerged in a non-fluorinated surfactant consisting of a 5% solution of Triton X-301/6-1577 L-2-4775/6198 WN (from Rohm & Haas), which is mixed in distilled water. A vacuum of 29 inches of mercury pressure is applied to the material for three hours. The material is removed from the vacuum vessel. It is completely wetted as seen by its translucent appearance, and is allowed to dry. Once dry, the material is retrofitted on an H 4 cathode. Once completely mounted on the cathode, the material is rewetted by submerging the cathode in a tank of 70° C. water for 90 minutes. The water is permitted to cool down to about 50° C. before removing the cathode. Once the cathode is removed from the bath, the material does not appear to be fully rewetted, due to the lack of a consistent dull, translucent, matt finish.

While the cathode is being readied for mounting on the anode base, it is noticed that the microporous separator within one hour's time has begun to dry out. This is visible by large white, dry spots appearing on the diaphragm. To determine the effect of this "dry out" evidenced after 1 hour's exposure to air, a sample of microporous separator, wetted by the above procedure using Triton X-301, was placed in a laboratory cell and operated at 1.5 ASI for five days. The attached Table I shows a loss of wettability taking place, as witnessed by the rising voltage and anolyte head heights.

TABLE I

| Time in Operation (Days) | Voltage @ 1.5 ASI | Anolyte Head Height (inches) | Anolyte Temp. °C. |
| --- | --- | --- | --- |
| initial | 3.80 | 1.87 | 70 |
| 1 | 4.20 | 3.62 | 72 |
| 2 | 4.27 | 4.37 | 71 |
| 4 | 4.45 | 7.00 | 69 |
| 5 | 4.50 | 8.62 | 68 |

EXAMPLES IV-VII

Microporous separator material was made wettable by the described process using several different 3M Company surfactants. Table II shows the results obtained.

TABLE II

| Example | Surfactant 2.5% Solution | Solvent | 3 Hours 29" Hg. psi | Rewetting in 70° C. water for 90 minutes, cooled to 50° C. before Removal |
| --- | --- | --- | --- | --- |
| IV | Fluorad FC-134 Cationic | 1:1 isopropyl alcohol/water | completely wetting achieved allowed to dry | complete rewetting achieved, became dry in 3 hrs. exposed to air |
| V | Fluorad FC-128 Anionic | 1:1 isopropyl alcohol/water | complete wetting achieved allowed to dry | complete rewetting achieved, began drying out in 1½ hrs. exposed to air |
| VI | Fluorad FC-430 Nonionic | 1:1 isopropyl alcohol/water | complete wetting achieved allowed to dry | complete rewetting achieved, began drying out in 1½ hrs. exposed to air |
| VII | Fluorad FC-170C Nonionic | distilled water | complete wetting achieved allowed to dry | complete rewetting achieved, remains wet after 2 hrs. exposed to air |

EXAMPLE VIII

Microporous separator material was wetted using a 2.5% solution of Fluorad FC-128 under 29" of Hg pressure under vacuum for 3 hours. Before being allowed to air dry, the material was rinsed briefly in water and installed in a lab cell, and operated at 1.5 ASI. Considerable foaming in the catholyte compartment took place during the initial 45 minutes of operation. Once the foaming ceased the cell leveled out at 3.40 volts with an anolyte head height of 1.87 inches. The next day, the cell continued to operate steadily at 3.64 volts and 2.00 inches of anolyte head height.

EXAMPLE IX

Sufficient material to cover several H 4 cathodes is made wettable using the process described in Example III utilizing a 3% solution of Zonyl ® FSN fluorosurfactant from DuPont. After drying the material is mounted on the cathodes. Wetting is activated by subjecting the treated material to different concentration of hot aqueous brine solutions. The results obtained are shown in Table III below. In all cases, complete rewetting occurs in the 70° C. brine solutions. After 90 minutes, the material is then operated in a chlor-alkali cell @ 1.5 ASI.

TABLE III

| NaCl Conc. (gpl) pH Cell | 100 7.1 | | | 100 12.0 | | | 150 7.1 | | | 150 12.0 | | |
| --- | --- | --- | --- | --- | --- | --- | --- | --- | --- | --- | --- | --- |
| Operation | Vts. | Head Ht." | Temp. °C. | Vts. | Head Ht." | Temp. °C. | Vts. | Head Ht." | Temp. °C. | Vts. | Head Ht." | Temp. °C. |
| initial | 4.85 | 2.0 | 25 | 4.88 | 2.0 | 25 | 5.00 | 2.0 | 25 | 4.38 | 2.0 | 25 |
| 1 hr. | 4.08 | 4.0 | 55 | 4.03 | 3.62 | 57 | 4.10 | 4.5 | 55 | 3.87 | 3.00 | 57 |
| 2 hrs. | 3.80 | 3.0 | 69 | 3.77 | 2.12 | 71 | 3.80 | 2.75 | 69 | 3.59 | 2.37 | 73 |
| 1 day | 4.06 | 4.75 | 70 | 4.12 | 3.25 | 71 | 4.06 | 4.25 | 73.5 | 3.93 | 3.87 | 73 |
| 2 day | 4.06 | 3.75 | 71 | | | | 4.00 | 2.87 | 73 | | | |

| NaCl Conc. (gpl) pH Cell | 200 7.15 | | | 200 12.0 | | | 250 7.65 | | | 250 12.0 | | |
| --- | --- | --- | --- | --- | --- | --- | --- | --- | --- | --- | --- | --- |
| Operation | Vts. | Head Ht." | Temp. °C. | Vts. | Head Ht." | Temp. °C. | Vts. | Head Ht." | Temp. °C. | Vts. | Head Ht." | Temp. °C. |
| initial | 4.80 | 2.0 | 25 | 4.60 | 2.0 | 25 | 5.35 | 2.0 | 25 | 4.40 | 2.0 | 25 |
| 1 hr. | 4.24 | 5.50 | 56 | 3.87 | 4.25 | 57 | 4.12 | 6.50 | 63 | 4.35 | 5.75 | 57 |
| 2 hrs. | 3.67 | 3.0 | 73 | 3.58 | 2.87 | 74 | 3.67 | 3.5 | 73 | 3.48 | 2.62 | 73 |
| 1 day | 3.75 | 3.75 | 76 | 3.83 | 3.62 | 76 | 3.75 | 3.87 | 78 | 3.67 | 3.12 | 78 |
| 2 day | 3.82 | 3.37 | 75 | | | | 3.78 | 3.25 | 78 | 3.75 | 3.25 | 76.0 |

| NaCl Conc. (gpl) pH Cell | >280 12 | | | 50 6.6 | | |
| --- | --- | --- | --- | --- | --- | --- |
| Operation | Vts. | Heat Ht." | Temp. °C. | Vts. | Head Ht." | Temp. °C. |
| initial | 5.0 | 2.0 | 25 | 5.35 | 2.0 | 25 |
| 1 hr. | 4.74 | 6.12 | 62.5 | 4.41 | 5.0 | 45 |
| 2 hrs. | 4.06 | 3.87 | 69.0 | 3.85 | 4.0 | 71 |

TABLE III-continued

| | | | | | | |
|---|---|---|---|---|---|---|
| 1 day | 3.85 | 2.25 | 73.0 | 4.08 | 5.25 | 74 |
| 2 day | | | | 4.23 | 6.0 | 71 |

While the invention has been described in conjunction with specific examples thereof, this is illustrative only. Accordingly, many alternatives, modifications and variations will be apparent to those skilled in the art in light of the foregoing description and it is therefore intended to embrace all such alternatives, modifications and variations as to fall within the spirit and broad scope of the appended claims.

We claim:

1. A method of making a hydrophobic polymeric electrolytic cell separator wettable to the contents of an electrolytic cell, which comprises (a) before installing into the cell contacting the surfaces of the manufactured separator with a fluorinated surface active agent in a liquid medium imparting hydrophilic properties thereto and (b) inactivating the hydrophilic properties of the separator by drying which properties may be reactivated by contacting the separator surfaces with aqueous solutions above ambient temperature.

2. The method of claim 1 wherein the separator is comprised of polytetrafluoroethylene and the fluorinated surface active agent is a member selected from the group consisting of anionic, cationic and nonionic types.

3. The method of claim 2 wherein the fluorinated surface active agent is applied to the separator under vacuum.

4. The method of claim 3 wherein the hydrophilic properties of the separator are reactivated in-stiu after installation into the cell by feeding an aqueous solution into the cell at a temperature of at least 50° C.

5. The method of claim 3 wherein the hydrophilic properties of the separator are reactivated after installation of the separator onto the cell cathode by contacting said cathode with an aqueous solution at a temperature of at least 50° C.

6. The method of claim 3 wherein the fluorinated surface active agent is a nonionic type having a formula $$F_3C(CH_2)_mCH_2CH_2O(CH_2CH_2O)_nH,$$

wherein m is in the range of 3 to 19 and n is in the range of from 6 to 19.

7. A separator of the method of claim 6.

8. A separator of the method of claim 1.

9. A method of permanently wetting a porous hydrophobic polymeric cell separator which comprises (a) before installing into an electrolytic cell contacting the surfaces of the manufactured separator with a fluorinated surface active agent in a liquid medium whereby a film of the agent adheres to the exterior surfaces and interior pore walls of the separator; (b) drying separator; (c) installing the separator into an electrolytic cell while in a dried state; (d) before starting up the cell wetting the separator by feeding heated water or brine into the cell, and (e) feeding concentrated brine solution into the cell and starting up the cell.

10. The method of claim 9 wherein the separator is comprised of polytetrafluoroethylene and the fluorinated surface active agent is a member selected from the group consisting of anionic, cationic and nonionic types.

11. The method of claim 10 wherein the fluorinated surface active agent is applied to the separator under vacuum.

12. The method of claim 8 wherein the fluorinated surface active agent is a nonionic type having the formula $$F_3C(CH_2)_mCH_2CH_2O(CH_2CH_2O)_nH,$$

wherein m is in a range of 3 to 19 and n is in the range of from 6 to 19.

13. The method of claim 10 wherein the nonionic surface active agent is in aqueous solution of a lower alkanol.

14. A separator of the method of claim 7.

15. In a method of making a separator sheet material suitable for use in an electrolytic cell comprising the steps of (a) forming the sheet comprising a hydrophobic fluorinated polymer, a pore forming additive and lubricant; (b) sintering the sheet material and (c) removing the pore forming additive the improvement comprising (A) before installing into the cell contacting the surfaces of a sheet material with a fluorinated surface active agent in a liquid medium making the exterior surfaces and interior pore walls wettable to the contents of a chlor-alkali cell, and (B) inactivating the wettability properties of the separator by drying, said wettability properties being subject to reactivation by contacting the separator surfaces with aqueous solutions above ambient temperature.

16. The method of claim 12 wherein the separator is comprised of polytetrafluoroethylene and the fluorinated surface active agent of (A) is a material of the formula $$F_3C(CH_2)_mCH_2CH_2O(CH_2CH_2O)_nH$$

wherein m is in the range of 3 to 19 and n is in the range of from 6 to 19.

17. The method of claim 13 wherein the fluorinated surface active agent is a material of the formula:

$$F_3C(CH_2)_mCH_2CH_2O(CH_2CH_2O)_nH$$

wherein m is 5 to 9 and n is about 11.

18. The method of claim 13 wherein the wettability properties of the separator are reactivated in-situ after installation into the cell by feeding water or brine into the cell at a temperature above 50° C.

19. The method of claim 13 wherein the wettability properties of the separator are reactivated after installation of the separator onto the cell cathode by contacting said cathode with water or brine at a temperature of at least 50° C.

20. A separator of the method of claim 12.

21. A method of making a hydrophobic microporous separator wettable to the contents of a chlor-alkali cell which comprises (a) applying a film of fluorosurfactant solution to a previously manufactured separator, said solution containing an active compound of the formula:

$$F_3C(CH_2)_mCH_2CH_2O(CH_2CH_2)_nH$$

wherein m is from 5 to 9 and n is about 11.
(b) removing any excess solution from the separator whereby the surfaces are substantially dry, and
(c) after installation onto the cell cathode contacting the surfaces of the separator with heated water or brine.

22. A method of activating the wettability properties of a manufactured polymeric microporous separator previously treated with a fluorosurfactant solution and dried prior to installation into an electrolyte cell, which method comprises after installing into the cell contacting the surfaces of the separator with aqueous solutions.

23. The method of claim 22 wherein the surfaces of the separator are treated with heated water.

24. The method of claim 22 wherein the surfaces of the separator are treated with heated brine solution.

25. A separator of the method of claim 22.

* * * * *

UNITED STATES PATENT OFFICE
CERTIFICATE OF CORRECTION

Patent No. 4,252,878　　　　Dated February 24, 1981

Inventor(s) Christine A. Lazarz, Ursula I. Keller and Edward H. Cook, Jr.

It is certified that error appears in the above-identified patent and that said Letters Patent are hereby corrected as shown below:

In Claim 6, line 46; Claim 12, line 13; Claim 16, line 41; Claim 17, line 48 and Claim 21, line 68, the formula in each instance should appear as follows:

$$F_3C(CF_2)_mCH_2CH_2O(CH_2CH_2O)_nH$$

Signed and Sealed this

Twenty-sixth Day of April 1983

[SEAL]

Attest:

Attesting Officer

GERALD J. MOSSINGHOFF

Commissioner of Patents and Trademarks